United States Patent
Duarte et al.

(10) Patent No.: US 6,916,204 B2
(45) Date of Patent: Jul. 12, 2005

(54) SHIELDING DEVICE FOR A CONNECTION BETWEEN A LIGHT AND A COMPLEMENTARY MODULE

(75) Inventors: Marc Duarte, Bobigny (FR); David Myotte, Bobigny (FR); Jean-Marc Nicolai, Bobigny (FR)

(73) Assignee: Valeo Vision, Bobigny Cedex (FR)

( * ) Notice: Subject to any disclaimer, the term of this patent is extended or adjusted under 35 U.S.C. 154(b) by 0 days.

(21) Appl. No.: 10/799,478

(22) Filed: Mar. 11, 2004

(65) Prior Publication Data
US 2004/0180578 A1 Sep. 16, 2004

(30) Foreign Application Priority Data
Mar. 14, 2003 (FR) .......................................... 03 03212

(51) Int. Cl.⁷ .......................................... H01R 13/648
(52) U.S. Cl. ...................................... 439/607; 315/82
(58) Field of Search .................... 439/607; 315/82; 362/263, 265

(56) References Cited

U.S. PATENT DOCUMENTS

| | | | | |
|---|---|---|---|---|
| 4,674,015 A | | 6/1987 | Smith | |
| 5,107,405 A | * | 4/1992 | Makita | 362/467 |
| 5,119,275 A | * | 6/1992 | Makita | 362/459 |
| 5,188,444 A | * | 2/1993 | Makita et al. | 362/519 |
| 5,343,370 A | * | 8/1994 | Ohashi et al. | 362/459 |
| 5,382,876 A | * | 1/1995 | Sugasawa et al. | 315/82 |
| 5,434,763 A | * | 7/1995 | Hege et al. | 362/265 |
| 5,529,506 A | | 6/1996 | Onoda | 439/95 |
| 5,562,339 A | * | 10/1996 | Tanaka et al. | 362/519 |
| 5,597,232 A | * | 1/1997 | Ohashi et al. | 362/265 |
| 5,607,228 A | * | 3/1997 | Ozaki et al. | 362/263 |
| 5,653,528 A | * | 8/1997 | Schmidt et al. | 362/226 |
| 5,678,916 A | * | 10/1997 | Watanabe et al. | 362/465 |
| 5,700,079 A | * | 12/1997 | Woerner et al. | 362/496 |
| 5,727,873 A | * | 3/1998 | Tyson | 362/294 |
| 5,838,109 A | * | 11/1998 | Kobayashi et al. | 315/58 |
| 5,879,073 A | * | 3/1999 | Hori et al. | 362/344 |
| 5,895,113 A | | 4/1999 | Ozaki et al. | 362/265 |
| 5,975,715 A | | 11/1999 | Bauder | |
| 6,008,584 A | * | 12/1999 | Kodaira et al. | 315/82 |
| 6,043,614 A | * | 3/2000 | Tessnow et al. | 315/291 |
| 6,072,277 A | * | 6/2000 | Yamamoto et al. | 315/82 |
| 6,102,550 A | | 8/2000 | Edwards, Jr. | 362/221 |
| 6,123,439 A | * | 9/2000 | Hiranaka et al. | 362/459 |

(Continued)

FOREIGN PATENT DOCUMENTS

| | | |
|---|---|---|
| DE | 41 33 002 A1 | 4/1993 |
| DE | 196 54 190 | 7/1997 |
| EP | 1 136 749 A1 | 9/2001 |
| FR | 2 769 072 | 9/1997 |
| WO | WO 02/10640 A1 | 2/2002 |

OTHER PUBLICATIONS

French Office Action, dated Nov. 19, 2003.

*Primary Examiner*—Ross Gushi
(74) *Attorney, Agent, or Firm*—Morgan & Finnegan, LLP

(57) ABSTRACT

The present invention relates to a light device comprising in particular a complementary module receiving a set of signals via a first electrical connection, and a light element comprising at least one element generating electromagnetic interference, each element generating electromagnetic interference being supplied via a distinct complementary electrical connection, the first electrical connection and each complementary electrical connection being connected to a single connector. The connector comprises a first set of contact areas of the first electrical connection and at least one set of complementary contact areas, each set of complementary contact areas being intended to receive one of the complementary electrical connections, only the set of complementary contact areas being surrounded separately by an electromagnetic shielding element. The invention also relates to the motor vehicle equipped with such a light device.

19 Claims, 2 Drawing Sheets

U.S. PATENT DOCUMENTS

| | | | |
|---|---|---|---|
| 6,161,951 A * | 12/2000 | Yoneyama et al. | 362/516 |
| 6,176,604 B1 * | 1/2001 | Dubrovin et al. | 362/539 |
| 6,309,089 B1 * | 10/2001 | Yoneyama et al. | 362/263 |
| 6,322,239 B1 * | 11/2001 | Nitta et al. | 362/543 |
| 6,364,515 B1 * | 4/2002 | Daub et al. | 362/548 |
| 6,382,823 B1 * | 5/2002 | Kibayashi | 362/548 |
| 6,390,657 B1 * | 5/2002 | Billot | 362/519 |
| 6,474,856 B2 * | 11/2002 | Billot | 362/548 |
| 6,540,385 B2 * | 4/2003 | Ikeda et al. | 362/512 |
| 6,550,935 B1 * | 4/2003 | Ueno et al. | 362/263 |
| 6,672,747 B2 * | 1/2004 | Yamaguchi et al. | 362/549 |
| 6,690,114 B2 * | 2/2004 | Nakayama et al. | 315/77 |
| 6,734,632 B2 * | 5/2004 | Yamaguchi | 315/57 |
| 6,749,327 B2 * | 6/2004 | Nishiyama | 362/548 |
| 6,767,121 B2 * | 7/2004 | Bost et al. | 362/521 |
| 2001/0030877 A1 | 10/2001 | Billot | 362/548 |
| 2002/0067617 A1 | 6/2002 | Imachi et al. | 362/507 |
| 2002/0067619 A1 | 6/2002 | Ikeda et al. | 362/512 |
| 2002/0155738 A1 | 10/2002 | Ohsawa et al. | 439/98 |
| 2004/0042229 A1 | 3/2004 | Duarte et al. | 362/516 |
| 2004/0184281 A1 | 9/2004 | Duarte et al. | 362/509 |

* cited by examiner

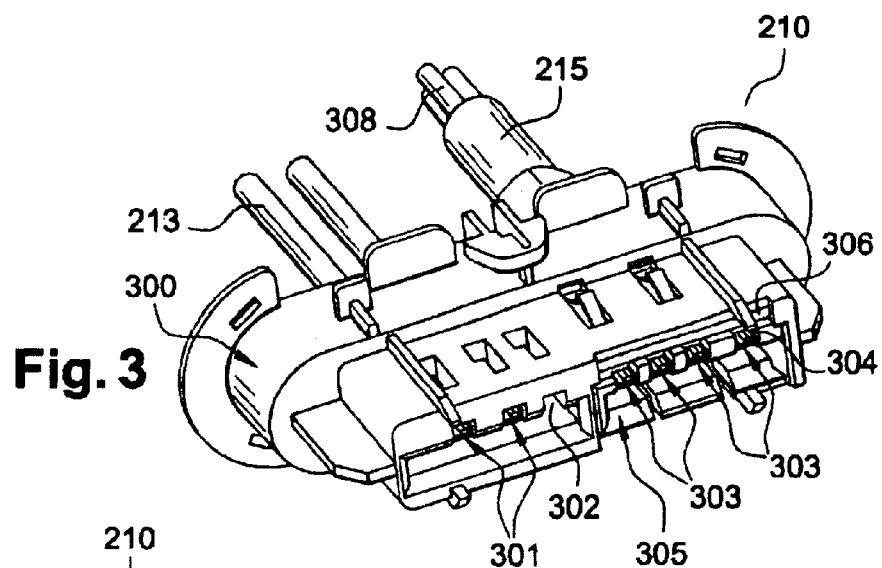
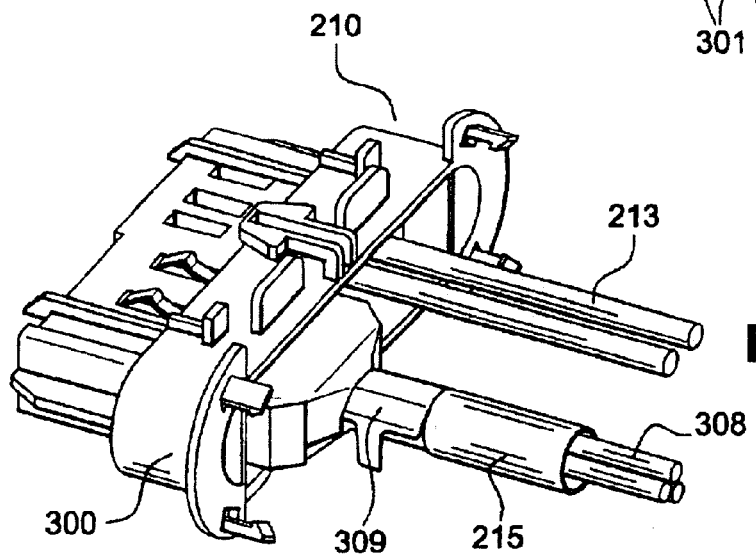
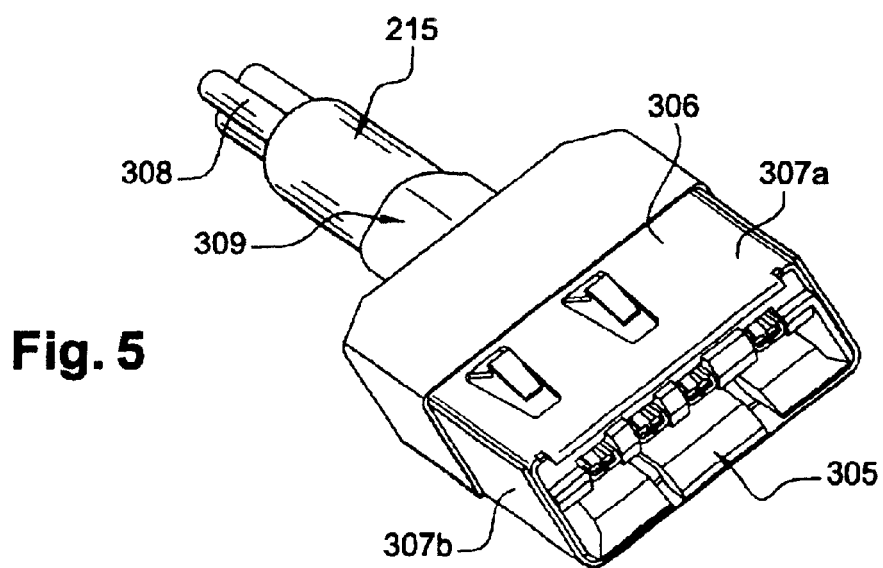

SHIELDING DEVICE FOR A CONNECTION BETWEEN A LIGHT AND A COMPLEMENTARY MODULE

FIELD OF THE INVENTION

The object of the present invention is a shielding device which provides electrical continuity for the shielding, aimed at reducing the electromagnetic radiation, of a light device, in particular with regard to a connection between a light element and a complementary module of the light device. It therefore relates to light devices which comprise a light element and a complementary module intended to be fixed onto—or in—the said light element, and which comprise an electrical connection which is to connect the complementary module and the light element.

BACKGROUND OF THE INVENTION

The purpose of the invention is essentially to provide shielding continuously for an electrical cluster connecting, in a particular solution of association of these two elements, the light element and the complementary module; this association solution has advantages, in particular in terms of ease of assembly of the light element with the complementary module, and additionally in terms of size of the complementary module when it is assembled with the light element, or in terms of simplicity of the moulds used in producing the light element. Shielding of an electrical cluster means protection disposed on an electrical cluster which limits the electromagnetic radiation from this cluster so as to satisfy the various standards in force, in particular the EMC (standing for Electromagnetic Compatibility) standard.

The field of the invention is, in general terms, that of motor vehicle lights. In this field, various types of light are known, amongst which there are essentially:

- side lights, with low intensity and range;
- dipped headlights, with a greater intensity and a range on the road of around 70 metres, which are used essentially at night and where the distribution of the light beam is such that it does not dazzle the driver of a vehicle being passed;
- long-range headlights, and additional lights of the long-range type, where the vision area on the road is around 200 metres, and which must be switched off when passing another vehicle so as not to dazzle its driver;
- improved headlights, referred to as dual mode, which combine the functions of dipped lights and headlight by incorporating a removable shield;
- fog lights.

The device according to the invention may relate to any one of these lights. Moreover, the complementary module participating in the device according to the invention may comprise a set of electrical and/or electronic and/or mechanical elements intended directly for the functioning of the light or for the functioning of accessory and complex functions associated with the light. More particularly, the complementary module may, for example:

- either contain an electronic card of the LCS (Light Control System in English, standing for lighting control system) card type, which serves for managing the implementation of so-called complex functions (FBL, DBL, DRL, Cordy etc) for the light with which this electronic card is associated;
- or comprise a control card for controlling a mechanical element of the actuator type;
- or be a ballast; a ballast is a special complementary module intended preferably to be integrated in a light device of the dipped headlight type using a discharge lamp as a light source. Ballasts of the Xenon system type are in particular found, frequently referred to as HID (High Intensity Discharge in English, standing for high intensity discharge), which are necessary for creating and maintaining an electric arc used in xenon lamps. An electronic module creates a high voltage within the ballast in order to obtain the electric arc at the light source used. In this type of light, a complementary module of the ballast type is therefore essential for supplying the energy necessary for the correct functioning of the light. The invention will more particularly be described, by way of example solely, in the context of a light device of the dipped headlight type with a complementary module of the ballast type.

In the state of the art, light devices are known which propose a solution of connection between a light element and a complementary module. Such a light device is illustrated schematically in FIG. 1.

In this figure, a light device 100 is essentially composed of a light element 101 and a ballast 102 of the HID type. In the light element 101, there is in particular a reflector 106 in which a light source 103 has been placed, of the discharge lamp type. The light source 103 produces a light beam which emerges from the light element 101 at an exit surface 108, which constitutes the front part of the light element 101. The light source 103, which rests on a lamp holder element 104, is connected to a high voltage module 105 serving to supply it.

The high voltage module is supplied by means of a first electrical connection 107, constituting an output cluster, which is shielded and which emerges from the light element 101 at the first opening, provided in a bottom face 109 of the light element 101, in which a first connector counter-part 110 has been disposed. This first counter-part 110 is intended to receive a first connector 111 of the ballast 102. The latter comprises a second connector 112, associated with a second connector counter-part 113 disposed at a second opening provided in the bottom face 109 of the light element 101. A second non-shielded electrical connector 117, constituting an input cluster, is connected to the second connector 112; it routes various electrical signals, in particular a supply signal for the ballast and various control signals coming from the vehicle.

The connection between the ballast 102 and the light element 101 is made between the bottom face 109 of the light element 101 and a top face 115 of the ballast 102, at a recess 114 provided in at least part of the bottom face and the rear face of the light element 101, that is to say approximately under the assembly consisting of the reflector 106, the lamp holder element 104 and the high voltage module 105. The ballast 102 is fixed to the light element 101 by means of at least two screws 116 which are disposed vertically in openings provided for this purpose.

In choosing the arrangement of the ballast 102, the least hot region of the light device is in particular considered. Generally this region corresponds to the region situated under the reflector element 101, which moreover is fairly accessible and consequently facilitates assembly: it is at this point that the heat produced by the light source 103 is the least great, and the bottom part of the light element 101 is easier to access than, for example, the rear part.

However, in achieving optimum integration of a complementary module within the light device, a set of constraints must be complied with:

it must be done by means of an assembly operation which is as simple as possible;

it must be compact;

in order to prevent any damage to the elements contained in the ballast, it must take account of the high temperatures which may arise in the functioning of the light device;

it must take account of the need for transmissions of electrical signals between the various components of the light device;

the association between the light device and the complementary module must not give rise to problems of impermeability for any one of these parts.

However, the assembly between the light element and the complementary module as depicted in FIG. 1 does not comply with these constraints.

First of all, the fact that the connector counter-parts 110 and 113 are disposed vertically on the rear face 109 of the light element 101 poses a first problem: this is because the mould which is used to fabricate the light element 101 opens out in a horizontal direction, and the need to be able to dispose vertical connector counter-parts requires the presence of slides in the mould used. The presence of two connectors is also a problem per se; this is because, the higher the number of connectors, the more tricky and lengthy the performance of the assembly. A first problem is that the light devices depicted are relatively bulky, the complementary module 102 having a considerable height. A fourth problem lies in the complexity of the assembly operation, in particular because of the fixing means used: in the state of the art described, it is necessary to use at least two screws to connect the light element 101 and the ballast 102. The more limited the number of screws, the better is the duration and simplicity of assembly.

To respond to the problems which have just been disclosed, a solution of association between a light element associated with a complementary module, one example embodiment of which is depicted in FIG. 2, has recently been proposed. This solution has in particular the particularity of presenting a single connector for providing the various connections between the various electrical connections participating. FIG. 2 shows a device 200 in vertical section, which is composed in particular of a light element 201 and a complementary module 202 of the HID ballast type, which can in particular comprise an electronic control card 216. Like in FIG. 1, there is found, in the light element 201, in particular a reflector 212 in which a light source 203 has been placed, of the discharge lamp type. The light source 203 produces a light beam which emerges from the light element 201 at an exit surface 208, which constitutes the front part of the light element 201. The light source 203, which rests on a lamp holder element 204, is connected to a high voltage module 205 serving to supply it.

A recess 206 is for example provided in at least a part of the bottom surface 207 and a part 209 of a rear surface 208 of the light element 201, the light device being considered in a normal operating position on a motor vehicle in defining the orientations of these surfaces, the exit surface of the light beam constituting the front face of the light element.

In the light device 200, it has been sought to limit the bulkiness related to the addition of the complementary module of the ballast type 202. Thus a single connector 210 is disposed, for example by snapping in and with a little clearance, as depicted in FIG. 2, on the rear part 209 of the light element 201 which is situated level with the recess 206. The junction of the connector 210 with a suitable contact area of the complementary module can thus be made in a vertical plane, referred to as the contact plane or junction plane, that is to say by moving the ballast 202 in a horizontal direction towards the light element 201, rather than a vertical direction as was the case in the example described in FIG. 1. The size in the direction of the height, which was previously due to the presence of several connector counter-parts and connectors in a horizontal junction plane, has disappeared. With such a new arrangement, the overall height of a light device comprising a complementary module advantageously decreases. The recess 206 is possibly slightly extended horizontally, that is to say it advances a little more under the reflector 212.

However, a light device like the one depicted in FIG. 2 poses a difficulty in production with regard to the electrical connection. This is because it is necessary to make coexist, at a single connection area, various electrical connections, some of which convey signals liable to interfere, by means of electromagnetic interference, with other signals:

a first connection 213 conveys a first set of supply and control signals from the outside of the light device 200 as far as the ballast 202. This first electrical connection 213 enters the light element 201 at an opening 214 in order to be switched to the connector 210. These signals are low voltage signals, of the level of the vehicle battery; the signals are filtered moreover in order not to be noisy;

a second connection 215 conveys, from the connector 210 to the high voltage module 205, a second set of signals, which are supply signals for the light source 203. These signals are produced by the ballast 202 from the first set of signals which have undergone processing within the ballast.

The latter signals are said to be medium voltage; they have typically a maximum amplitude of a thousand volts. They have high electromagnetic radiation, which may in particular interfere with the first set of signals and various control signals used by the electronic card 216, the various signals being directly adjacent at least with regard to the connector 210. This is because, even if the connection 215 is shielded, the connector 210 to which it is connected is, in the state of the art, not shielded. It is therefore necessary to find a solution for preventing this interference which arises at the connector 210. One solution proposed in the state of the art is to dispose various filters on the electronic card 216 and/or ferrites in the ballast 202 and/or around the cluster. Such a solution does however pose a problem of cost and complicates the manufacture of the ballast 202.

One object of the present invention is to respond to this problem. In general terms, a shielding device is proposed in the invention, involving in particular connector, to which there are connected firstly a connection conveying signals which interfere weakly in terms of electromagnetic radiation, and secondly a connection conveying signals which radiate sufficiently to interfere with the adjacent signals, said connector providing the shielding, in terms of electromagnetic radiation, of the second connection as far as its contacts disposed in the connector. Though the invention essentially makes reference to an arrangement of the complementary module 202 as depicted in FIG. 2, it is directly applicable to all light devices equipped with a complementary module intended to be associated with a light element and for which the electrical connection between these two elements is made by means of a single connector.

To this end, in the invention, it is proposed essentially to incorporate in the single connector a shielding element intended to surround solely contact areas affording connection with a shielded cluster. In a particular example embodiment of the device according to the invention, the electronic card can be embedded directly in the partially shielded connector, that is to say it has a set of contact areas on its surface which are directly accessible to the various contact areas of the connector when the electronic card is fitted in the connector. In this case, it is not essential to shield the various contact areas of the electronic card.

SUMMARY OF THE INVENTION

The invention therefore relates to essentially a light device comprising at least one complementary module receiving a set of signals via a first electrical connection, and a light device comprising at least one element generating electromagnetic interference, each element generating electromagnetic interference being supplied via a distinct complementary electrical connection, the first electrical connection and each complementary electrical connection being connected to a single connector, characterised in that the connector comprises a first set of contact areas of the first electrical connection and at least one set of complementary contact areas, each set of complementary contact areas being intended to receive one of the complementary electrical connections, only the set of complementary contact areas being surrounded separately by an electromagnetic shielding element.

The light device according to the invention can, in addition to the principal characteristics mentioned in the previous paragraph, have one or more of the following secondary characteristics:

each shielding element consists of two half-shells, in particular fitted one in the other, or several shells or a single shell;

each shielding element is fixed to a shielded metallic braid or sheath or to a shielded cable in order to constitute a shielded cluster containing the complementary electrical connection received by the set of complementary contact areas surrounded by said shielding element;

the fixing between the shielding element and the shielded metallic braid or the shielded cable is effected by means of a ferrule;

the connector consists of a plastic housing comprising at least one piece in particular made from plastic or based on plastic in which cavities are moulded intended to receive one of the sets of complementary contact areas and one end of one of the complementary electrical connections, each plastic piece being surrounded by one of the shielding elements; each shielding element is then able to be dissociated from the plastic housing, accompanied by the plastic piece;

the connector consists of a plastic housing in the thickness of which each shielding element is disposed, and in which cavities are moulded intended to receive sets of complementary contact areas and one end of the complementary electrical connections;

the light device comprises a contact element for providing shielding continuity between each shielding element and the complementary electrical connection received by the set of complementary contact areas surrounded by said shielding element;

the element generating electromagnetic interference is a light source, and the contact element connects an earth signal present on a track of an electronic card of the complementary module, and a wire at least partially bared inside the complementary electrical connection supplying the light source, the said wire reaching one end of the complementary electrical connection supplying the light source, said end being situated close to the light source;

the contact element connects an earth signal present on a track of an electronic card of the complementary module, and an at least partially bared wire within the complementary electrical connection, said wire being fixed between the ferrule and the metallic braid;

the contact element provides the putting into contact between a metallic shielding element and an electrically earthed element of an electronic module of the complementary module;

each shielding element cooperates with a second additional shielding element disposed on a connector counter-part intended to receive the connector, so that continuity of the shielding of each complementary electrical connection is provided at contact areas of the connector counter-part;

the connector is disposed on the surface, that is to say across or on the housing containing the light element, or inside the light element;

the or at least one of the elements generating electromagnetic interference is chosen from amongst a light source, a ballast or an electronic card of the LCS type. It is possible for example to have two light sources which will be dealt with according to the invention. It is possible in this case to have only one module for the two lamps.

Another object of the invention is a motor vehicle equipped with a light device, having the principal characteristics which have been specified, with possibly at least one of the secondary characteristics which have just been mentioned.

The invention and its various applications will be understood better from a reading of the following description and an examination of the figures which accompany it. These are presented only by way of indication and are in no way limiting of the invention. In particular, the example embodiment of the invention illustrated in the figures shows a light device in which the element generating electromagnetic interference is a light source. In more general terms, the invention concerns all the light devices comprising an element generating electromagnetic interference, whether the latter be a light source, a motor or any other element acting in the context of a light device and requiring the presence of shielding.

Likewise, the example embodiment of the invention illustrated in the figures shows a light device in which the number of elements generating electromagnetic interference is limited solely to the light source, but the example illustrated can easily be extended to a light device comprising several elements generating electromagnetic interference, each of these elements then being the subject of distinct electromagnetic shielding in particular with regard to the single connector.

BRIEF DESCRIPTION OF THE DRAWINGS

The figures show:

in FIG. 3, a first perspective view of a connector participating in an example embodiment of the shielding device according to the invention;

in FIG. 4, a second perspective view of a connector participating in an example embodiment of the shielding device according to the invention;

in FIG. 5, a perspective view of a shielding device participating in an example embodiment of the shielding device according to the invention.

DESCRIPTION OF THE PREFERRED EMBODIMENTS

In the various figures, the elements which are common to several figures will have kept the same references.

Figure 1:
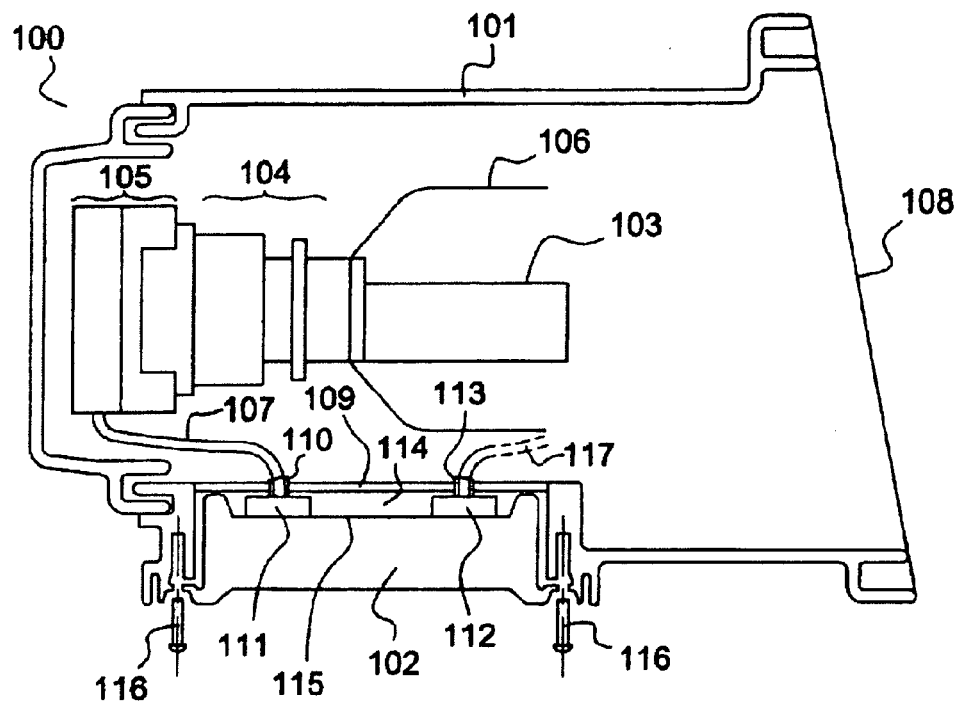
in FIG. 1, already described, a representation of an association between a light device and a complementary module in the state of the art.
Figure 2:
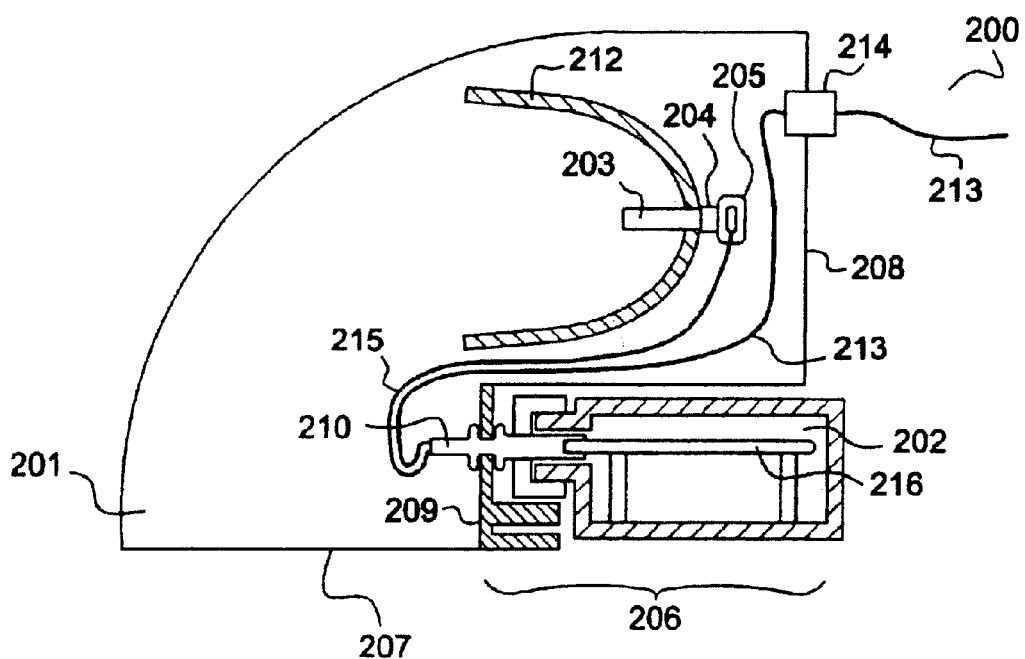
in FIG. 2, a schematic representation of a view in section of an association between a light device and a complementary module able to incorporate the shielding device according to the invention.

FIGS. 3 and 4 depict the connector 210 in perspective, respectively seen in front view and seen from behind, as proposed in the shielding device according to the invention. They are also described with reference to FIG. 5, which is a representation of an element of the connector 210, which participates more particularly in the shielding device according to the invention. The connector 210 is delimited by a plastic housing 300 having openings on its front face and its rear face. The first connection 213, which was already visible in FIG. 2, is depicted in the form of two cylindrical wires, each of the wires conveying a set of particular electrical signals, which enter the connector at its rear face. These two wires convey in particular power supply signals supplied by the vehicle battery and various control signals intended for the functioning of the complementary module 202. These signals are low voltage signals whose amplitude corresponds to that of the vehicle battery. Their electromagnetic radiation is therefore weak and does not cause any interference on the adjoining electrical connections. An electromagnetic shielding of this connection is therefore not necessary.

The two wires 213 terminate in a first set of contact areas 301 accessible from the front face of the connector 210. The contact areas are disposed in a first set of cavities 302 provided directly in the plastic housing 300. These contact areas are intended to be touched by associated contact areas present within the complementary module 202. A second set of contact areas 303 is disposed in a second set of cavities 304.

The second set of cavities 304 can be either directly provided in the plastic housing 300 or in an intermediate plastic piece 305. In the first case, a shielding element 306 is incorporated in the thickness of the plastic housing 300 so as to laterally surround the second set of contact areas and the termination of a second set of conductive wires 308 constituting a complementary electrical connection, designated in the example illustrated as the second electrical connection 215, which is a shielded cluster, already visible in FIG. 2. In the second case, which corresponds to the example depicted in FIGS. 3 to 5, the shielding element 306, more particularly visible in FIG. 5, surrounds the intermediate plastic piece 305. The example embodiment corresponding to the second case has the advantage that the shielded cluster 215 is removable; it can easily be extracted in its entirety from the plastic housing 300. In cases where several elements generating electromagnetic interference are present within the light device according to the invention, shielding elements are provided, of the shielding element 306 type, each of the shielding elements being removable independently of the other shielding elements. The structure and the connections of the various shielding elements, when several are disposed in the plastic housing 300, are identical to those described for the shielding element 306. Each of the shielding elements can be removed separately from the plastic housing 300. It is also possible to provide for only some of these shielding elements to be removable, rather than all.

The shielding element 306 can for example be composed of two metallic half-shells 307-*a* and 307-*b* which are cut and pressed so as to ensure impermeability of the shielding at the second set of contact areas 303. In another example embodiment, the shielding element is produced in a single metallic piece cropped and bent so as to ensure impermeability of the shielding. It is provided with two conductive connecting elements of the spring type, which will ensure the continuity of the shielding between the shielding means 306 and the complementary module 202.

The shielded cluster 215 can consist either of a shielded cable or a metallic braid or sheath which surrounds, over their entire length, the second set of conductive wires 308. This is typically composed of three supply wires for the light source; in a first example, a first wire being at a potential of approximately 600 volts, a second wire being at a potential of approximately −400 volts, and the last having a zero potential; in a second example, corresponding to the case where the complementary module comprises a low-voltage motor, the potentials observed are around plus or minus 12 volts. The electrical characteristics of the signals conducted in these conductive wires do indeed require shielding in order not to create electromagnetic interference on the first conductive connection 213 for example. The metallic braid or the shielded cable constituting the shielded cluster 215 is, in one example embodiment, fixed to the shielding element 306 by means of a ferrule 309.

The continuity of the shielding between the shielded cluster 215 and the shielding element 306 can be achieved in various ways:

either using a track on the electronic card 216 visible in FIG. 2, the said track being connected to the earth of the electronic card 216, by connecting the said track and a conductive wire at least partially bared inside the shielded cluster connecting either the other end of the shielded cluster, close to the light source 203, or the metallic braid or shielded cable whilst being fixed, for example, at the ferrule 309, or by contact between one of the metallic shielding elements, that is to say a half-shell 307-*a* or 307-*b*, the ferrule 309, the braid or the shielded cable, and the electrical earth of the electronic module which creates a high voltage within the ballast 202. The putting into contact can be achieved by means of a specific piece, for example a claw which is added to the shielding device.

The various contact areas 301 and 303 depicted comprise terminals; a terminal is an electrical connection element composed of one or more conductive elements of the metallic lug type, slightly deformable in order to allow a support, comprising a set of contact areas, to slide without too much resistance in an opening in which the said terminal is disposed; the deformation of the terminal is elastic so that it remains in abutment on the support area at which it is situated, the said area preferably corresponding to a contact area of the support. The contact areas 301 and 303 are therefore particularly adapted to receive contact areas directly disposed on the surface of the electronic card 216 contained in the electronic module 202. The contact areas of the electronic card 216 are thus inserted directly in the various cavities 302 and 304. It is therefore not essential to provide a particular shielding device on the same side as the electronic module 202.

In other embodiments, where the complementary module 202 is connected to the connector 210 by means of a connector counter-part, provision is made, in a first example embodiment of the invention, to electromagnetically shield, for example by means of a shielding element 306 similar to that present in the connector 210, the contact areas of the connector counter-part which are intended to be associated with the shielded contact areas 303 of the connector 210. In a second example embodiment, the contact element 306 is extended out of the housing 300 so that it surrounds the contact areas to be shielded of the connector counter-part when the latter receives the connector 210.

According to the invention, it is possible to provide means ensuring the electrical continuity between the shielding means (306) and the complementary module (202), in particular elastic means of the spring type.

It is also possible to provide means ensuring electrical continuity between the complementary module (202) and an electronic card (216) contained in the said module. In this way the continuity of the shielding as far as earth is ensured, since the complementary module is mounted so as to be earthed.

In conclusion, the invention has therefore made it possible to collect together in a single connector a plurality of electrical contact areas (the input contact areas, the output contact areas, and possibly other contact areas for other functions), in particular all those necessary, and to effect a "selective" shielding: according to the invention: only some of these contacts are shielded. Two major advantages in this choice:

firstly, only the areas which it is actually necessary to shield are shielded, secondly, it is thus possible to prevent different contact areas interfering with each other mutually on an electromagnetic level, which might be the case if they were collected together within the same shielding.

In concrete terms, going back to the example according to the invention depicted in FIGS. 3 to 5, if the shielding means surrounded all the electrical contact areas, not only the areas 303, such a connector would no longer meet the current EMC standards, which would make it necessary to add, for example, additional electronic filtering functions on the electronic card.

There is thus a more effective selective shielding which can be made standard from one light model to another.

What is claimed is:

1. Light device comprising at least one complementary module receiving a set of signals via a first electrical connection, and a light device comprising at least one element generating electromagnetic interference, at least one of the elements generating electromagnetic interference being supplied via a distinct complementary electrical connection, the first electrical connection and each complementary electrical connection being connected to a single connector, wherein the connector comprises a first set of contact areas of the first electrical connection and at least one set of complementary contact areas, each set of complementary contact areas being intended to receive one of the complementary electrical connections, the first set of contact areas of the first electrical connection and/or at least one of the set or sets of complementary contact area being surrounded, separately from the other contact areas, by electromagnetic shielding means.

2. Light device according to claim 1, wherein the connector comprises a first set of contact areas of the first electrical connection and at least one set of complementary contact areas, each set of complementary contact areas being intended to receive one of the complementary electrical connections, only the sets of complementary contact areas being surrounded separately by one or more electromagnetic shielding means.

3. Light device according to claim 1, wherein each shielding element consists of two or more half-shells, in particular fitted one in the other, or a single shell.

4. Light device according to claim 1, wherein each shielding element is fixed to a shielded metallic braid or sheath or to a shielded cable in order to constitute a shielded cluster containing the complementary electrical connection received by the set of complementary contact areas surrounded by said shielding element.

5. Light device according to claim 1, wherein the fixing between the shielding element and the shielded metallic braid/sheath or the shielded cable is effected by means of a ferrule.

6. Light device according to claim 1, wherein the connector consists of a plastic housing in the thickness of which each shielding element is disposed, and in which cavities are moulded intended to receive sets of complementary contact areas and one end of the complementary electrical connections.

7. Light device according to claim 1, wherein at least one contact element provides the putting into contact between a metallic shielding element and an electrically earthed element of an electronic module of the complementary module.

8. Light device according to claim 1, wherein each shielding element cooperates with a second additional shielding element disposed on a connector counter-part intended to receive the connector, so that continuity of the shielding of each complementary electrical connection is provided at contact areas of the connector counter-part.

9. Light device according to claim 1, wherein the connector is disposed on the surface or inside the light element.

10. Light device according to claim 1, wherein the or at least one of the elements generating electromagnetic interference is chosen from amongst a light source, a ballast or an electronic card of the LCS type.

11. Motor vehicle equipped with a light device according to claim 1.

12. Light device according to claim 1, wherein the connector is electrically connected to an electronic card of a complementary module.

13. Light device according to claim 12, which provides means providing electrical continuity between the shielding means and the complementary module, in particular elastic means of the spring type.

14. Light device according to claim 12, which provides means providing electrical continuity between the complementary module and an electronic card contained in the said module.

15. Light device according to claim 1, wherein the connector consists of a plastic housing comprising at least one piece, in particular plastic, in which there are moulded cavities intended to receive one of the sets of complementary contact areas and one end of one of the complementary electrical connections, each piece being surrounded by one of the shielding elements.

16. Light device according to claim 15, wherein each shielding element can be dissociated from the box, in particular plastic.

17. Light device according to claim 1, which comprises a contact element for providing shielding continuity between each shielding element and the complementary electrical connection received by the set of complementary contact areas surrounded by said shielding element.

18. Light device according to claim 17, wherein the element generating electromagnetic interference or one of them if there are several of them is a light source, and wherein the contact element connects an earth signal present on a track of an electronic card of the complementary module, and a wire at least partially bared inside the complementary electrical connection supplying the light source, the said wire reaching one end of the complementary electrical connection supplying the light source, said end being situated close to the light source.

19. Light device according to claim 17, wherein the fixing between the shielding element and the shielded metallic braid/sheath or the shielded cable is effected by means of a ferrule and wherein the contact element connects an earth signal present on a track of an electronic card of the complementary module, and an at least partially bared wire within the complementary electrical connection, said wire being fixed between the ferrule and the metallic braid.

* * * * *